E. R. HEWITT.
AUTOMOBILE.
APPLICATION FILED SEPT. 21, 1908.

1,101,697. Patented June 30, 1914.

Witnesses
F. F. Chudoba
M. L. Clark

Inventor
Edward R. Hewitt

UNITED STATES PATENT OFFICE.

EDWARD R. HEWITT, OF RINGWOOD, NEW JERSEY.

AUTOMOBILE.

1,101,697.

Specification of Letters Patent. Patented June 30, 1914.

Application filed September 21, 1908. Serial No. 454,009.

*To all whom it may concern:*

Be it known that I, EDWARD R. HEWITT, a citizen of the United States, resident of Ringwood, county of Passaic, in the State of New Jersey, have invented certain new and useful Improvements in Automobiles, of which the following is a specification, reference being had to the accompanying drawings.

My invention relates to automobiles, and more particularly to engines, primarily intended for automobiles, although in a measure suitable for other purposes, and has for its particular purpose the production as a unitary structure of a compact, simple, power plant, including engine, transmission, and other associated parts for convenience, strength, and other advantages which will appear.

Among other advantages incident to the use of my invention are the strengthening in the mounting and support of the parts of an automobile, which are usually associated with power transmission, and the simplification of various other elements as a result of the embodiment of my invention, whether such other parts are directly associated with the structure involving my invention, or only indirectly therewith.

Figure 1:
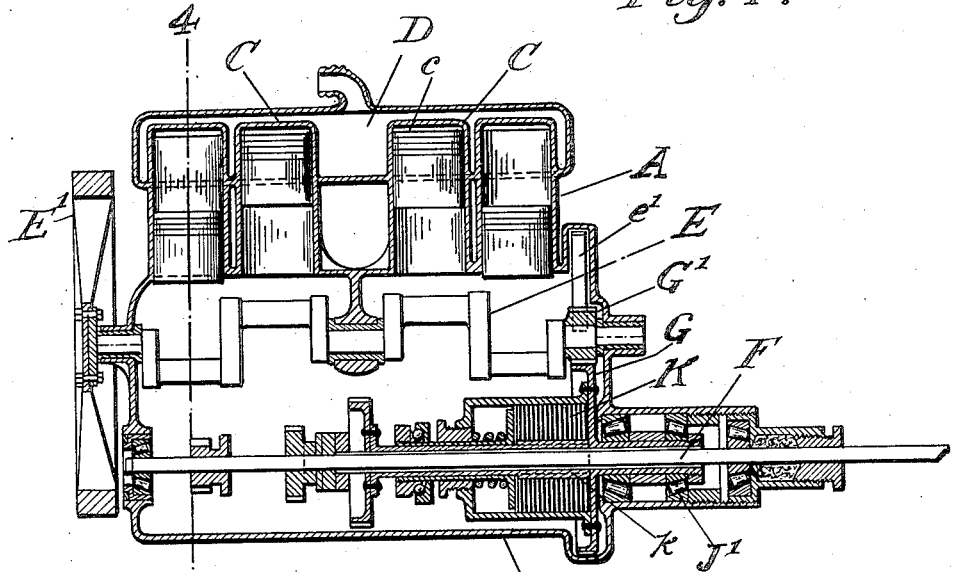
Figure 2:
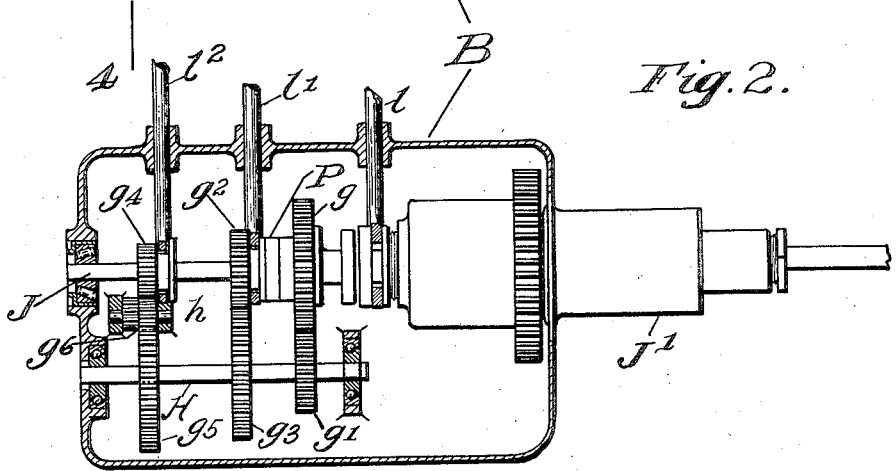
Figure 3:
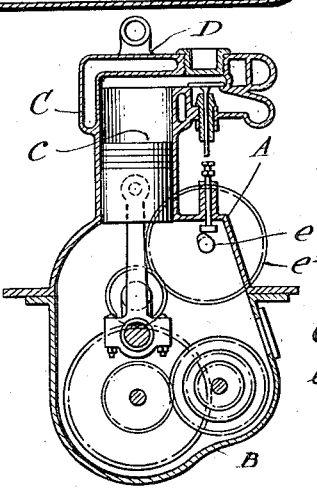

To more fully set forth my invention I have illustrated in the accompanying drawings one form of construction embodying the same, in which Figure 1 is a longitudinal vertical section through the power plant; Fig. 2 is a horizontal section through the power transmission shafts in the lower part of the plant casing; Fig. 3 is a transverse vertical section of the plant, taken substantially at 4—4 Fig. 3.

It will thus be seen that the structure, in the particular form illustrated embodying my invention, comprises a casing A, which I will call the upper casing or engine casing, and a casing B, which I will call the lower or transmission casing. In the upper casing are cylinders C with pistons $c$, and a water jacket D, a crank-shaft E coöperating with the pistons and their connecting rods and the usual cam-shaft $e$ for operating valves of the engine which is driven by the gear $e'$ in engagement with the gear $G'$. The lower casing contains the main transmission shaft F and the counter-shaft H and gears $g$, $g^2$ and $g^4$, on the main-shaft to coact with gearing $g'$, $g^3$ and $g^5$, mounted on the counter-shaft H. Suitable bearings J and J' support the main transmission shaft. A clutch K is mounted on the transmission-shaft and adapted to clutch the gear G to drive the main-shaft F, or disconnect it. A gear G' is mounted on the crank-shaft E and meshes with the gear G. Levers $l'$, $l^2$ serve by any usual connections to operate the change speed gearing, and are in turn actuated by any usual lever or levers located in a convenient position. The operating lever $l$ may be actuated by a pedal lever suitably arranged. These control levers need not be illustrated herein as they are well known in the art.

It will be seen from the construction so illustrated and described that a practically unitary casing comprising A and B, as upper and lower parts, connected by flanges or any suitable means, preferably as shown in the plane of the crank shaft bearings, is the result of my invention. The upper casing contains all the power cylinders and the bearings for the crank-shaft E, and can be assembled with pistons, connecting rods, crank-shaft and central bearings separately from the lower half of the casing. The lower half of the casing has bearings in either end for the main transmission shaft F, and suitable bearings for the counter-shaft H, and contains all the transmission and clutch mechanism necessary for the transmission of the engine power to the driving or propeller shaft as well as disconnecting means therefor. The transmission shaft, it will be noticed, is mounted below the engine, thereby bringing all the clutching and transmission mechanism and gearing within a space longitudinally no longer than that occupied by the engine, which in the present case illustrated comprises four cylinders. By this arrangement the width of the lower portion of the casing, necessary for the transmission mechanism, is practically no wider than would be necessary for the engine casing. On the other hand, the supporting of the single casing with transmission mechanism and shaft directly below cylinders and crank-shaft, makes it convenient to have the crank-shaft and the fan, when mounted in a vehicle, directly behind the radiator or cooler, which is an advantageous change from the usual arrangement heretofore practised.

The clutch construction may be of any suitable form, but a simple one as shown more particularly in Fig. 3 comprises what is known as a multiple disk arrangement, alternate disks being connected to the driving gear G, and the other disks connected to a sleeve $k$, while a spring K' tends to force the nest of disks together, causing the clutching of the driving and driven members. The gear $g$ being mounted on the sleeve $k$ drives the gear $g'$ on the counter-shaft, and through it and gears $g^3$ or $g^5$ drives either gears $g^2$ or $g^4$, which latter two are mounted on a squared portion of the transmission-shaft F. The gears $g^2$ and $g^4$ are longitudinally movable, so that either one or the other may be engaged with its complementary gear, thereby effecting a different speed transmission.

An additional reversing gear, such as $g^6$, mounted on a shaft $h$, may be used in any suitable way for effecting a reverse of transmitted motion from the counter-shaft to the transmission shaft in any usual manner. For direct drive the gear $g$, or sleeve $k$, may be directly clutched to the power-shaft F, as by the clutch P. It will be noted however that the crank-shaft drives the large gear G by means of a relatively small pinion G' so that a considerable step in the reduction from engine speed to driving speed is obtained between the engine and the transmission mechanism. On the other hand, the clutch speed being less than that of the crank-shaft, a stronger clutching effect is necessary to transmit the power, but this is entirely feasible in the arrangement shown, and with the improved clutches, and particularly the compact multiple disk clutch, offers no difficulty.

The operation of the clutch can be arranged so that practically all parts are mounted upon the casing, and no bell cranks or shafts need be added to the vehicle frame. Furthermore, by supporting the magneto directly on the engine casing and embodying the operating elements for change speed in the same casing, practically everything necessary for power generation, clutching, speed transmission, variation and reverse, is consolidated in a single element or unit structure occupying no longer space than is necessary for the engine if constructed separate. By the arrangement of gearing from crank shaft to clutch I bring the several shafts in my structure close together, further adding to the compactness of the whole. An additional simplification results in my being able to use a single gear on the engine shaft to drive both the cam-shaft and the transmission mechanism.

By my arrangement two castings readily and most conveniently accommodate all the necessary elements for the power plant and transmission, to coöperate in a most advantageous manner. However, the upper casting shown as a unit may be varied in form, and in turn may itself be made up of several parts suitably joined together, as, for instance, I may cast the cylinders separately and bolt them onto the upper crank shaft cover or casing. While referring to two main castings, I may in many cases construct either or both of a number of separate parts. Furthermore, the bearings of my crank shaft may be wholly supported on one member before the parts are connected to constitute the unit structure. In other ways I may modify features to gain accessibility, economy in construction, convenience, or other advantages.

A further advantage resulting from this arrangement is involved in the lubrication of the parts. The gearing, which is usually in a bath of oil, being directly below the cylinders receives any lubricant dripping from them or their bearings. On the other hand, at high speeds, some of the gears may throw oil which rather than doing harm, would only aid in lubricating the other parts above them.

On the whole, my invention affords a more compact structure than heretofore made, and is particularly adapted for purposes of automobile power. It makes possible the elimination of a considerable weight in parts otherwise necessary in separate casings made independently for engine and for transmission box. It brings all the machinery of the automobile in a unit of smallest possible size, and while doing so, supports the various elements in a relative position in more secure alinement, and the assembly and adjustment is more readily made and maintained.

While my invention may be variously embodied, although shown in one form, I do not mean to confine myself to that particular construction, but

What I claim and desire to secure by Letters Patent is:

1. In a combined automobile engine and transmission mechanism unit, a substantially two-part casing horizontally parted, said parts being arranged one above the other, cylinders, pistons and a crank-shaft supported in one of said parts, a transmission shaft parallel to the crank-shaft supported in the other part and projecting through one end thereof, a counter-shaft operatively disposed with respect to the transmission shaft, and means for connecting and disconnecting the counter-shaft from the crank-shaft.

2. In combination in a motor, a crank casing having in the upper part cylinders, pistons and a crank-shaft and associated mechanism, including a cam-shaft supported in the upper part, a driven shaft parallel to the crank-shaft, a lower crank-case section detachably secured to the upper part and supporting said driven shaft, a single gear on the crank-shaft, and a gear on the driven shaft and a gear on the cam-shaft driven by said single gear on the crank-shaft.

3. In combination in a motor, an upper crank case section crank-shaft, fly-wheel and cylinders, a lower crank case section, a counter-shaft parallel to the crank shaft supported in said section, sliding gears on said counter-shaft within the crank case and a clutch within said crank case for connecting the driving elements to and disconnecting the same from the crank-shaft and the counter-shaft.

4. In an automobile, a power generating and transmission unit comprising a casing, cylinders and crank-shaft supported in the upper part thereof, a transmission shaft and transmission mechanism supported in the lower section thereof including a clutch and sliding gears, means for shifting said gears projecting through the side of said lower crank case section, and bearings for said driven shaft exterior to said crank section.

In testimony whereof, I have signed my name to this specification at the borough of Manhattan, city and State of New York, on the second day of Sept. 1908, in the presence of two subscribing witnesses.

EDWARD R. HEWITT.

Witnesses:
JAMES M. CARPLES,
HERMANN F. CUNTZ.